US012807629B2

(12) United States Patent
Kim

(10) Patent No.: US 12,807,629 B2
(45) Date of Patent: Nov. 24, 2026

(54) COMPLEX COMPOUND COMPRISING CITRATE AND IRON ION AND FOOD COMPOSITION COMPRISING THE SAME

(71) Applicant: FERRAMED INC., Daejeon (KR)

(72) Inventor: Seyl Kim, Daejeon (KR)

(73) Assignee: FERRAMED INC., Daejeon (KR)

( * ) Notice: Subject to any disclaimer, the term of this patent is extended or adjusted under 35 U.S.C. 154(b) by 503 days.

(21) Appl. No.: 18/070,564

(22) Filed: Nov. 29, 2022

(65) Prior Publication Data

US 2024/0034744 A1 Feb. 1, 2024

(30) Foreign Application Priority Data

Jul. 28, 2022 (KR) ........................ 10-2022-0093687

(51) Int. Cl.
*C07F 11/00* (2006.01)
*A23L 33/165* (2016.01)

(52) U.S. Cl.
CPC ............. *C07F 11/00* (2013.01); *A23L 33/165* (2016.08)

(58) Field of Classification Search
CPC ...... C07F 11/00; C07F 15/025; A23L 33/165; A23L 33/10
USPC .......................................................... 556/138
See application file for complete search history.

(56) References Cited

U.S. PATENT DOCUMENTS

| | | | | |
|---|---|---|---|---|
| 5,753,706 A | 5/1998 | Hsu | | |
| 2009/0186939 A1* | 7/2009 | Chan | A61P 9/00 | 514/502 |
| 2016/0250626 A1* | 9/2016 | Himeda | C01B 3/22 | 423/648.1 |
| 2018/0071243 A1* | 3/2018 | Poradosu | A61P 3/12 | |

FOREIGN PATENT DOCUMENTS

| | | | |
|---|---|---|---|
| KR | 10-2020-0044030 A | 4/2020 | |
| KR | 10-2020-0099737 A | 8/2020 | |
| KR | 2020-0099737 A * | 8/2020 | A23L 29/00 |
| WO | WO-2007062561 A1 * | 6/2007 | C07C 51/43 |

OTHER PUBLICATIONS

Haynes et al., CRC Handbook, 2016-2017, CRC Press, 97th Edition, pp. 2-47, 4-25 (Year: 2017).*
The United States Pharmacopeial Convention, <711> Dissolution, Feb. 1, 2012, pp. 1-8 (Year: 2012).*
Merriam-Webster, room temperature, Apr. 10, 2010, Internet Archive WayBack Machine, p. 1 (Year: 2010).*
Brill-Karniely et al., "Triangular correlation (TrC) between cancer aggressiveness, cell uptake capability, and cell deformability", Jan. 15, 2020, Science Advances, vol. 6, pp. 1-13 (Year: 2020).*
Celic et al., "Structure and magnetic properties of a new iron(II) citrate coordination polymer", published 2013, Acta Crystallographica Section B, Structural Science, Crystal Engineering and Materials, vol. B69, pp. 490-495 (Year: 2013).*
Office Action from corresponding Korean Patent Application No. 10-2022-0093687, dated Sep. 16, 2022.

* cited by examiner

*Primary Examiner* — Fereydoun G Sajjadi
*Assistant Examiner* — Y. Lynnette Kelly-O'Neill
(74) *Attorney, Agent, or Firm* — Harness, Dickey & Pierce, P.L.C.

(57) ABSTRACT

The present application relates to a complex compound in which a citrate and an iron ion are combined while forming the following chemical formula, a food composition including the same, and a method of preparing the same.

10 Claims, 12 Drawing Sheets

(a) (b) (c)

(a) (b) (c)

COMPLEX COMPOUND COMPRISING CITRATE AND IRON ION AND FOOD COMPOSITION COMPRISING THE SAME

CROSS-REFERENCE TO RELATED APPLICATIONS

This application claims the benefit and priority to Korean Patent Application No. 10-2022-0093687, filed on 28 Jul. 2022. The entire disclosure of the application identified in this paragraph is incorporated herein by reference.

TECHNICAL FIELD

The present application relates to a complex compound including citric acid and iron and a food composition including the same.

BACKGROUND

About 2 billion people worldwide have anemia, and iron deficiency is the most common cause of anemia affecting millions of children, women, and men in both developed and developing countries. For iron deficiency, iron-rich foods may be eaten. When the intake of iron-rich foods is not sufficient, oral iron supplements may be prescribed. However, many oral iron supplements have poor solubility in the body or cause numerous negative side effects that lead to patient noncompliance.

U.S. Pat. No. 5,753,706 discloses that ferric citrate compounds may be used to control phosphate metabolism in patients and prevent metabolic acidosis. Also, ferric citrate is used as a food supplement and additive. Ferric citrate compounds are available for patients suffering from renal failure associated with hyperphosphatemia or patients predisposed to developing hyperphosphatemic conditions. Ferric citrate is also used as a food supplement and additive. Ferric citrate is characterized as a light brown to beige powder, odorless, and is used for a slight iron-containing sample.

In accordance with the Korean Food Additive Code, ferric citrate is slowly dissolved in cold water and readily dissolved in hot water, but the solubility thereof is weakened over time.

The inventors of the present invention have found a ferric citrate compound having a new chemical structure capable of improving the solubility of ferric citrate.

SUMMARY

Technical Problem

The present application is directed to providing a complex compound including citric acid and iron.

The present application is also directed to providing a method of preparing a complex compound including citric acid and iron.

Technical Solution

One aspect of the present application provides a complex compound in which a citrate and an iron ion are combined while forming the following chemical formula.

[Chemical Formula 1]

$$[Fe_a(H_3 \cdot C_6H_5O_7)_b(H_2O)]_n$$

In Chemical Formula 1, a ratio of a and b is 1:2 to 1:3, and n is an integer of 1 to 7.

In an embodiment of the present application, the complex compound may have a diameter of 1,000 nm to 3,000 nm.

In an embodiment of the present application, the complex compound may have a molecular weight of 440 to 3,080.

In an embodiment of the present application, an iron content in the complex compound may be 8.8 wt % to 12.7 wt %.

In an embodiment of the present application, the complex compound may be dissolved in 5° C. to 40° C. water.

In an embodiment of the present application, the complex compound may be dissolved in 5° C. to 40° C. water within 5 minutes.

In an embodiment of the present application, the complex compound may be dissolved in 20±5° C. water within 5 minutes.

In an embodiment of the present application, the iron ion may be a ferrous ion ($Fe^{2+}$).

In an embodiment of the present application, the complex compound may maintain a crystal structure at pH 2 to pH 4.

Another aspect of the present application provides a method of preparing a complex compound, which includes: mixing citric acid or a salt thereof and pure iron or electrolytic iron in a solvent; dehydrogenating the mixed solution at 20° C. to 80° C. and 7 atm to 20 atm; and stirring the solution after the removal of hydrogen gas.

In the preparation method according to an embodiment of the present application, the dehydrogenation may be performed for 1 day to 10 days.

In the preparation method according to an embodiment of the present application, the stirring may be performed at 10° C. to 60° C. for 1 hour to 120 hours.

Advantageous Effects

The complex compound according to an embodiment of the present application has high solubility in water and high in vivo solubility.

BRIEF DESCRIPTION OF THE DRAWINGS

The above and other objects, features and advantages of the present application will become more apparent to those of ordinary skill in the art by describing exemplary embodiments thereof in detail with reference to the accompanying drawings, in which.

DETAILED DESCRIPTION

Figure 1:
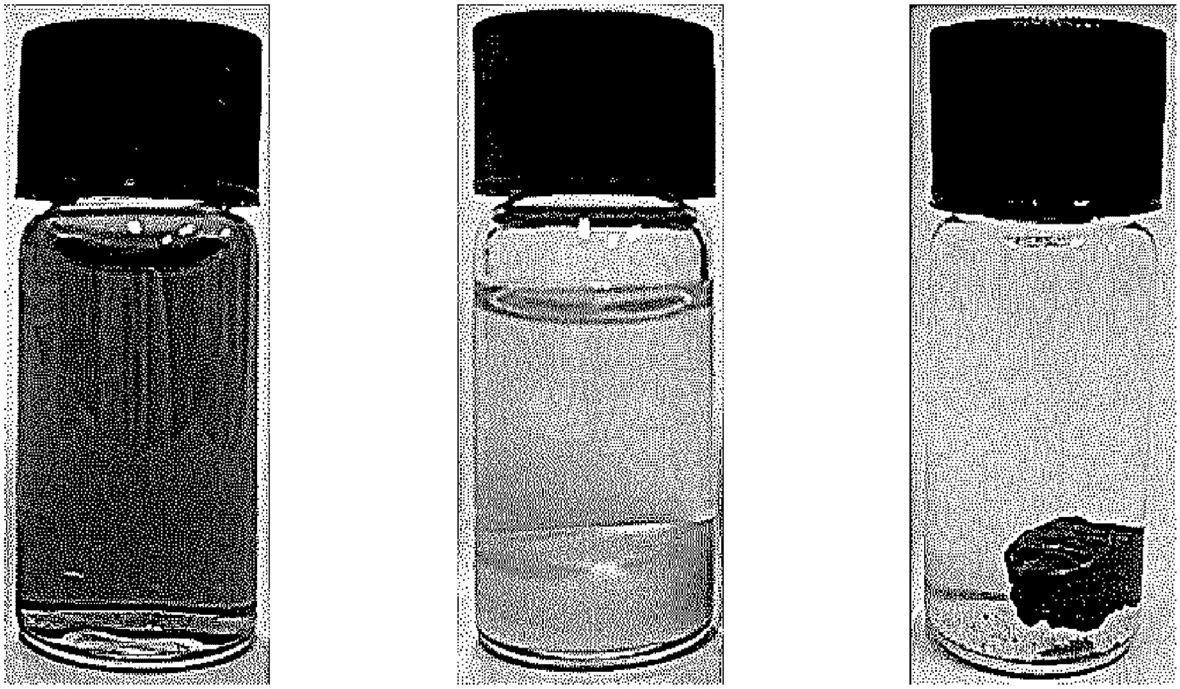
FIG. 1 shows a result obtained by measuring solubility in water.

Hereinafter, the present application will be described in further detail.

The following specific structural or functional descriptions are merely exemplified to explain embodiments according to the concept of the present application, and embodiments according to the concept of the present application may be implemented in various forms, and the embodiments described herein should not be construed as limiting the present application.

As embodiments according to the concept of the present application allow for various changes and a variety of embodiments, particular embodiments will be described in detail. However, this is not intended to limit embodiments according to the concept of the present application to specific embodiments, and it should be understood that all changes, equivalents, or substitutes are included within the spirit and technical scope of the present application.

The terminology provided herein is merely used for the purpose of describing particular embodiments and is not intended to limit the present application. The singular forms "a," "an," and "the" are intended to include the plural forms as well, unless the context clearly indicates otherwise.

Unless defined otherwise, all terms used herein, including technical or scientific terms, have the same meaning as commonly understood by those skilled in the art to which the present application pertains. Terms such as those defined in the commonly used dictionaries should be construed as having meanings consistent with the meanings in the context of the related art and are not to be interpreted in an ideal or overly formal sense unless explicitly defined herein.

As used in the specification and the claims below, the terms "comprise" "include," "comprising" and "including" are intended to specify a stated feature, integer, component, or step, but do not preclude the presence or addition of one or more other features, integers, components, steps, or groups thereof.

When used with time, the term "about" refers to a time range within ±5 hours, for example, ±1 hour. When used with temperature, the term "about" refers to a temperature range within ±5° C., for example, ±1° C. When used with percentages or other values, the term "about" refers to ±10%, for example, ±5%, of the stated percentage or value.

A complex compound of the present application may be a polymer coordination compound. The polymer coordination compound refers to a type of polymer-type complex compound in which complexes including metal ions and organic ligands, preferably, the same type of complexes in which metal ions are coordinated with organic ligands, are connected to each other through interaction, specifically, linked by a coordinate bond.

The polymer coordination compound in the present application is a type of coordination polymer in which complexes including metals and organic ligands, which serve as monomers, are connected to each other through a coordinate bond. The coordinate bond may be a form in which organic ligands are coordinated with two or more metal ions and the coordinated metal ions are also coordinated with two or more other organic ligands in a chain.

A complex compound of the present application may be a complex compound combined while forming the following Chemical Formula 1.

[Chemical Formula 1]

$$[Fe_a(H_3\cdot C_6H_5O_7)_b(H_2O)]_n$$

In Chemical Formula 1, a ratio of a and b may be 1:2 to 1:3, more specifically, 1:2.

In Chemical Formula 1, n is an integer of 1 to 132, specifically, an integer of 1 to 7.

The complex compound may have a molecular weight of 440 to 3,080. In this case, when an a:b ratio is 1:2, n is 1 to 7, and when an a:b ratio is 1:3, n is 1 to 4. The molecular weight refers to a weight-average molecular weight.

An iron ion in the complex compound may be a ferrous ion ($Fe^{2+}$). The complex compound has a characteristic of being suitable for application to the human body, particularly, has no toxicity to normal cells, by including a ferrous ion. In particular, the ferrous ion has advantages in that it is easily absorbed, is used in metabolism, and has no toxicity as compared to a ferric ion.

In an embodiment of the present application, an iron content in the complex compound may be 8.8 wt % to 12.7 wt %.

The complex compound may have a particle diameter of 1,000 nm to 3,000 nm, more specifically, 1,300 nm to 1,800 nm.

The complex compound has an advantage in that it is dissolved well in water compared to conventional citric acid. Conventional ferric citrate disclosed in the Korean Food Additive Code has a characteristic of being slowly dissolved in cold water. Also, conventional ferric citrate has a problem in that it is not completely dissolved in 5° C. to 40° C. water even after 60 minutes.

100% of the complex compound of the present application may be dissolved in 5° C. to 40° C. water in 5 minutes.

The complex compound of the present application has an advantage of being easily dissolved and decomposed in the body.

Another aspect of the present application provides a method of preparing a complex compound, which includes: mixing citric acid or a salt thereof and pure iron or electrolytic iron in a solvent; dehydrogenating the mixed solution at 20° C. to 80° C., more specifically 40° C. to 70° C., and even more specifically 50° C. to 60° C. and 7 atm to 20 atm, more specifically, 8 atm to 12 atm; and stirring the solution after the removal of hydrogen gas.

In the preparation method according to an embodiment of the present application, the dehydrogenation may be performed for 1 day to 10 days.

In the preparation method according to an embodiment of the present application, the stirring may be performed at 10° C. to 60° C. for 1 hour to 120 hours.

Still another aspect of the present application provides a food composition including the complex compound as an active ingredient.

The food composition may be an antioxidant food composition for improving or enhancing immune function.

As used in the present application, the term "improvement" refers to all actions that allow symptoms of suspected or affected subjects to be improved or advantageously altered using a composition including the complex compound as an active ingredient.

The food composition of the present application may be easily utilized as a food having an immunity enhancement effect, for example, as a main ingredient or supplementary ingredient of food, a food additive, a functional food, or a beverage.

Since daily intake of the food composition of the present application is possible, an effect of preventing or improving neuroinflammation can be expected, so the food composition is very useful.

As used in the present application, the "food" refers to a natural product or a processed product containing one or more nutrients, and preferably refers to a product that can be eaten directly after undergoing a certain degree of processing process. In a conventional sense, the food includes all types of foods, food additives, functional foods, and beverages.

Examples of the food according to the present application include various types of foods, beverages, chewing gums, tea, vitamin complexes, functional foods, and the like. In addition, examples of the food in the present application include special nutritional foods (e.g., milk formulas, infant foods, baby foods, etc.), processed meat products, fish meat products, tofu, muk (jelly type foods), noodles (e.g., ramen, noodles, etc.), breads, health supplement foods, seasoning foods (e.g., soy sauce, soybean paste, red pepper paste, mixed paste, etc.), sauces, confectioneries (e.g., snacks), candies, chocolates, chewing gums, ice creams, dairy products (e.g., fermented milk, cheese, etc.), other processed foods, kimchi, pickled foods (various types of kimchi, pickles, etc.), beverages (e.g., fruit drinks, vegetable drinks, soy milk, fermented drinks, etc.), and natural seasonings (e.g., ramen powder, etc.), but the present application is not limited thereto. The foods, beverages, or food additives may be manufactured by conventional manufacturing methods.

In addition, the "functional food" refers to a food group with added value so that the function of the corresponding food acts and is expressed for a specific purpose using physical, biochemical, and bioengineering techniques or a food designed and processed to sufficiently express the body's regulatory functions related to biological defense rhythm control, disease prevention, and recovery. Specifically, the functional food may be a health functional food. Also, the functional food may include sitologically acceptable food auxiliary additives and may further include appropriate carriers, excipients, and diluents typically used in manufacture of the functional food.

As used in the present application, the term "health functional food" refers to a food manufactured (processed) using raw materials or ingredients that have functionality useful for the human body in accordance with the Health Functional Food Act, and "functionality" means obtaining effects useful for health purposes such as regulating nutrients for the structure and function of the human body or physiological functions. Meanwhile, health food refers to a food that has an active health maintenance or enhancement effect compared to general food, and health supplement food refers to a food for the purpose of supplementing health, but in some cases, health functional food, health food, and health supplement food may be interchangeably used. The health functional food of the present application may be manufactured by a method typically used in the art. The health functional food may be manufactured in various types of formulations and, unlike general medicines, does not cause side effects that can occur when ingested for a long time by using a food as a raw material, and has excellent portability.

In addition, the "beverage" in the present application refers to a general term for drinking to quench thirst or enjoy taste and includes functional beverages. The beverage has no particular restrictions on ingredients other than those included as an essential ingredient in the indicated proportion and may contain various flavoring agents or natural carbohydrates as additional ingredients like conventional beverages.

In addition to those listed above, the food containing the complex compound may contain various nutrients, vitamins, minerals (electrolytes), flavoring agents such as artificial flavoring agents, natural flavoring agents and the like, coloring agents and fillers (cheese, chocolate, etc.), pectic acid and salts thereof, alginic acid and salts thereof, organic acids, protective colloidal thickening agents, pH controlling agents, stabilizers, preservatives, glycerin, alcohols, carbonizing agents as used in carbonated beverages, and the like, and the ingredients may be used alone or in combination.

In the food containing the complex compound of the present application, the complex compound according to the present invention may be included in an amount of 0.001 wt % to 90 wt %, preferably, 0.1 wt % to 40 wt % with respect to the total food weight. In the case of beverages, the complex compound may be included in an amount of 0.001 g to 2 g, preferably, 0.01 g to 0.1 g based on 100 ml, but in the case of long-term intake for the purpose of health and hygiene, or health control, the content of the complex compound may be below the above range. However, since an active ingredient has no problem in terms of safety, the complex compound may be used in an amount exceeding the above range and is not limited thereto.

Hereinafter, the present application will be described in further detail with reference to examples, comparative examples, and experimental examples. The following examples are provided only to promote understanding of the present application and do not limit the scope of the present application.

Example 1

An iron-citrate complex compound was synthesized by the following method.

Citric acid was dissolved in water to prepare a 0.5 M to 2 M aqueous citric acid solution, pure iron or electrolytic iron was added to the aqueous citric acid solution, and dehydrogenation was performed in a reactor capable of withstanding the internal pressure of dehydrogenation. The dehydrogenation was performed in a 50 to 60° C. oven at 10 atm for 3 days. After the reaction was completed, gas (hydrogen) was removed, the resulting solution was transferred to a new container, and stirring was performed while injecting 15% to 30% oxygen at room temperature and 100 rpm for 72 hours to induce polymerization.

The resulting product was filtered and recovered. As a result of the reaction, an iron-citrate complex compound (metaccel), which is a ferrous iron salt, was obtained with a yield of 10 to 15%. An iron content in the complex compound was 12.7 wt %.

Comparative Example 1

An iron-citrate complex compound, which is a ferrous iron salt, was prepared in the same manner as in Example 1, except that dehydrogenation was performed at 1 atm. An iron content in the complex compound was 5.76 wt %.

Comparative Example 2

Ammonia was added to a ferric sulfate solution to prepare ferric hydroxide, and citric acid was added to and dissolved in the ferric hydroxide. Then, concentration was performed at 60° C. or less to form a syrup, and the syrup was thinly applied on a glass plate and dried until it fell off in flakes, thereby preparing ferric citrate. An iron content in the ferric citrate was 16.5 to 18.5 wt %.

<Experimental Example 1> Measurement of Solubility in Water

The complex compounds of Example 1 and Comparative Examples 1 and 2 were dissolved in an amount of 200 g/L in 15° C. water, and results thereof are shown in FIG. 1.

Figure 10:
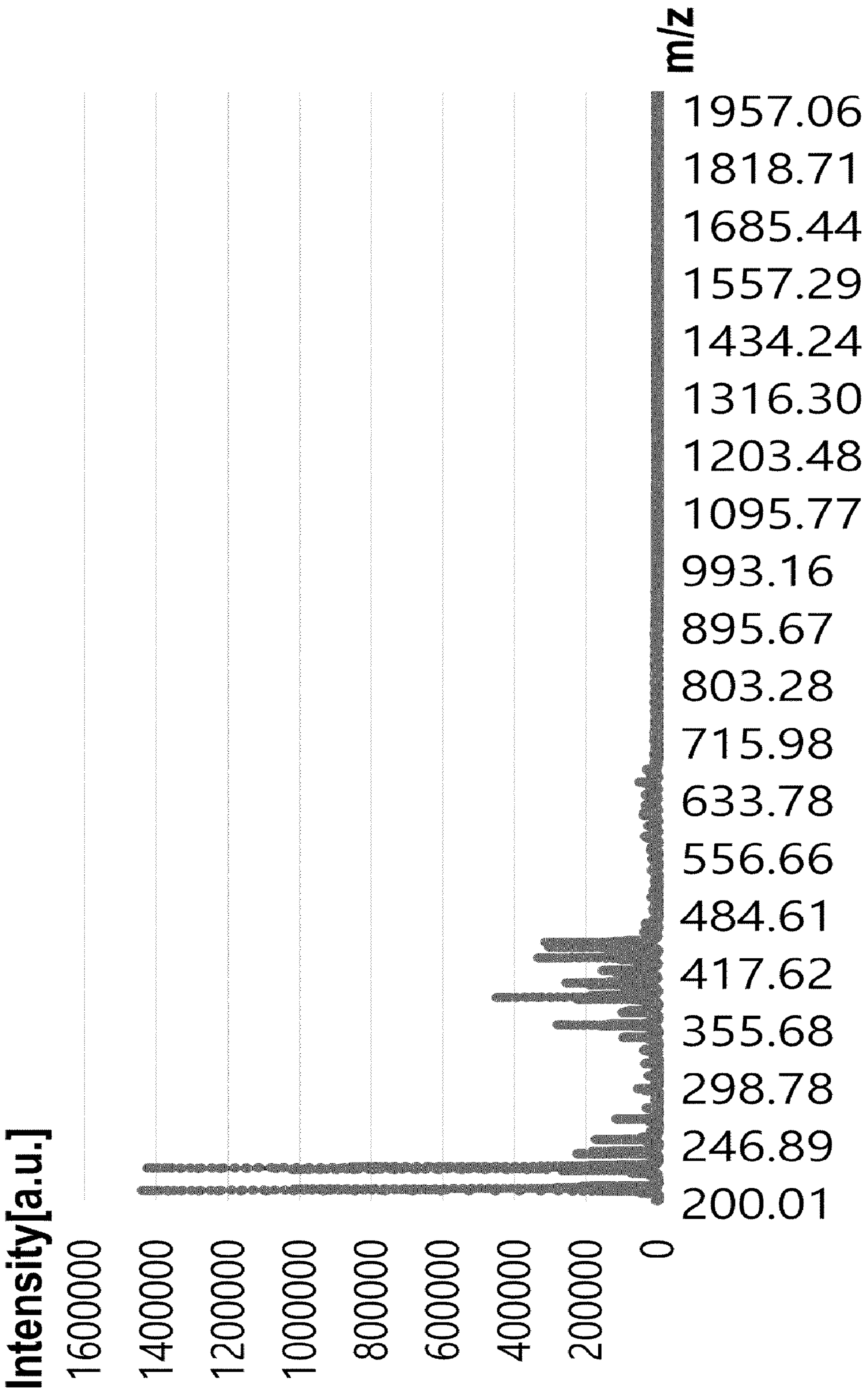
FIGS. 10 and 11 show MALDI-TOF analysis results.

In the case of Example 1 shown in FIG. 1A, 100% of the complex compound was dissolved within 5 minutes, and in the case of Comparative Example 1 shown in FIG. 1B, 10% of the complex compound was dissolved and 90% was precipitated. In the case of Comparative Example 2 shown in FIG. 1C, the complex compound was hardly dissolved.

<Experimental Example 2> Measurement of Complex Compound

1. NMR Analysis

Figure 2:
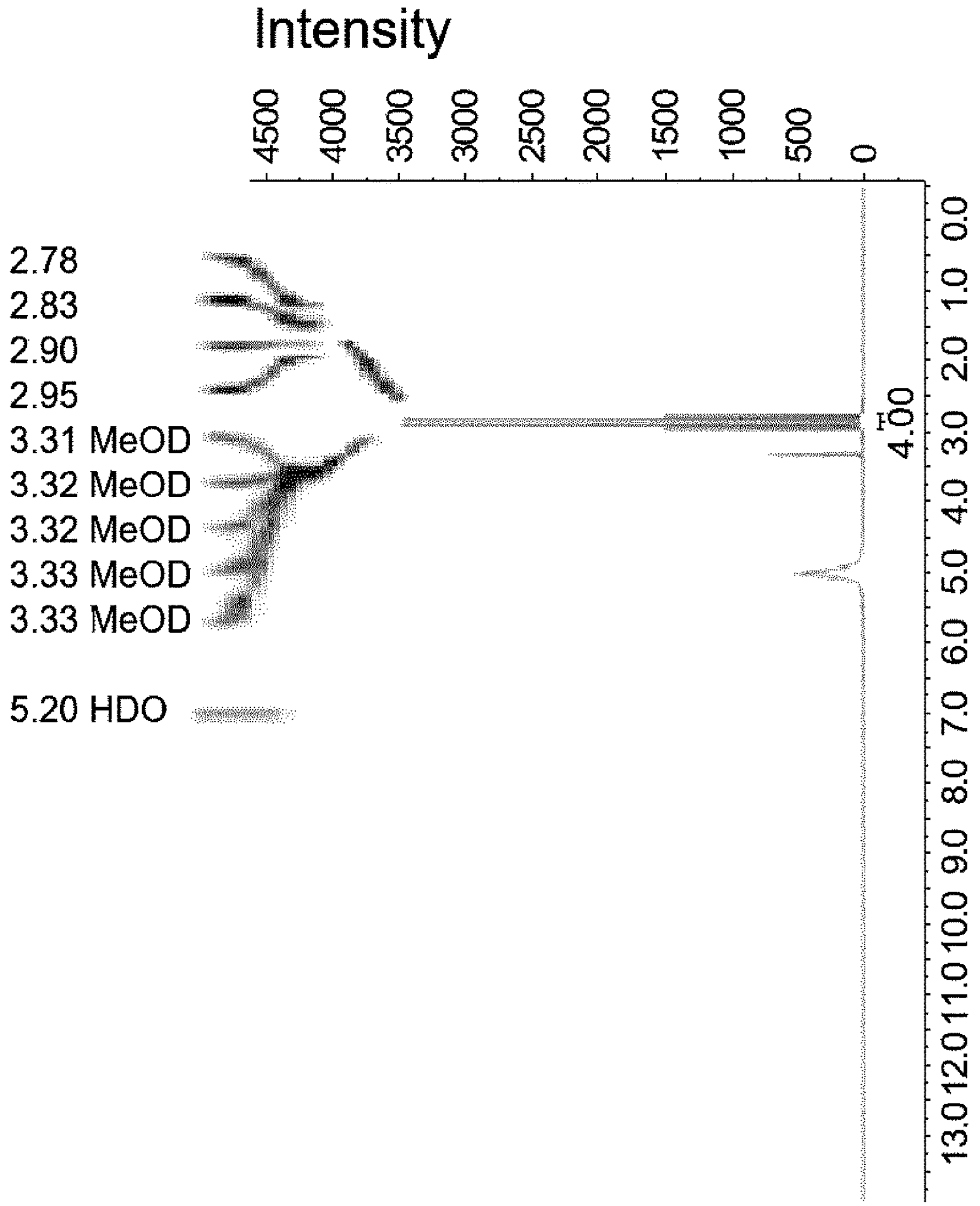
FIGS. 2, 3, 4 and 5 show results obtained by dissolving a complex compound and citric acid in solvents.
Figure 3:
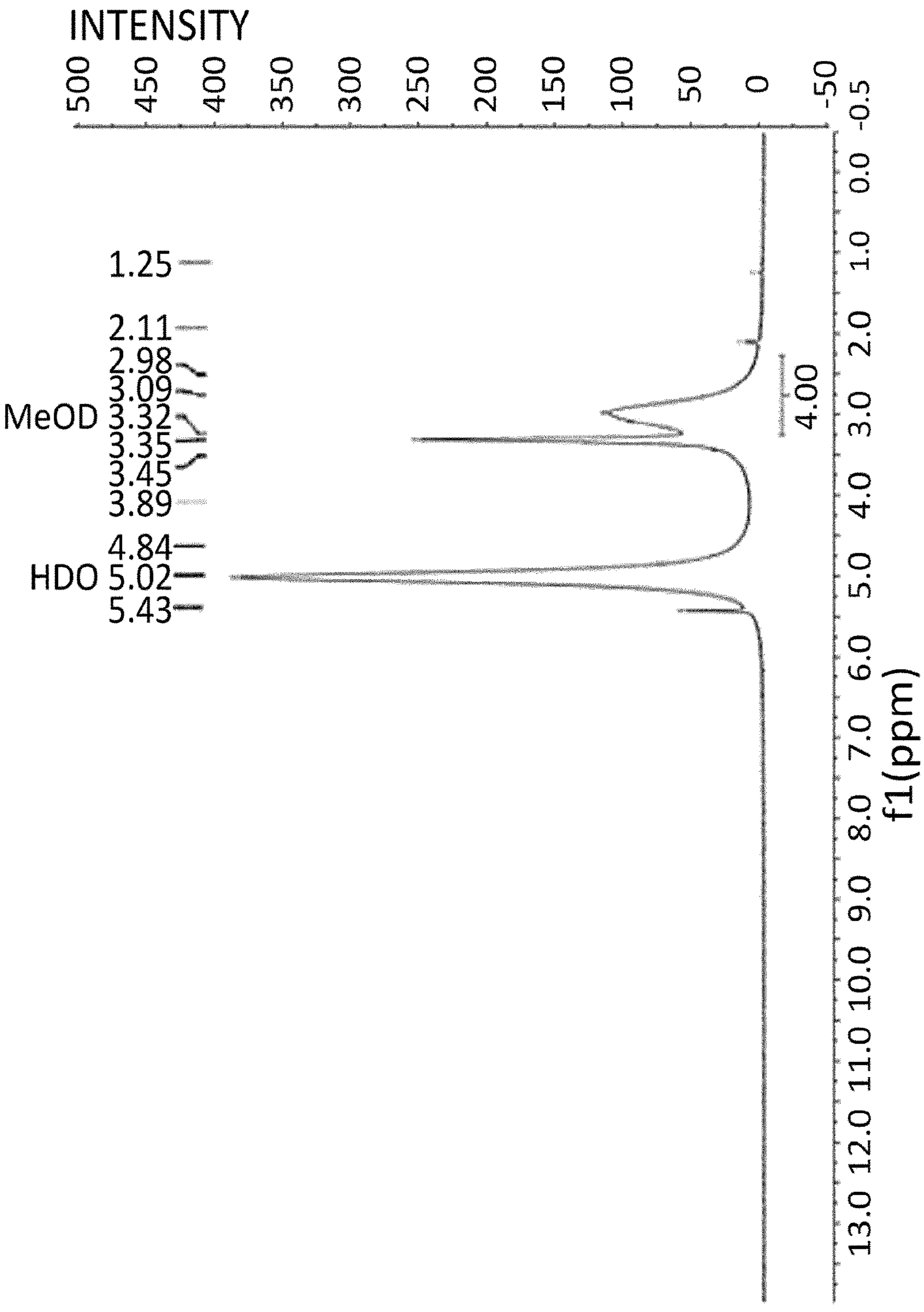
Figure 4:
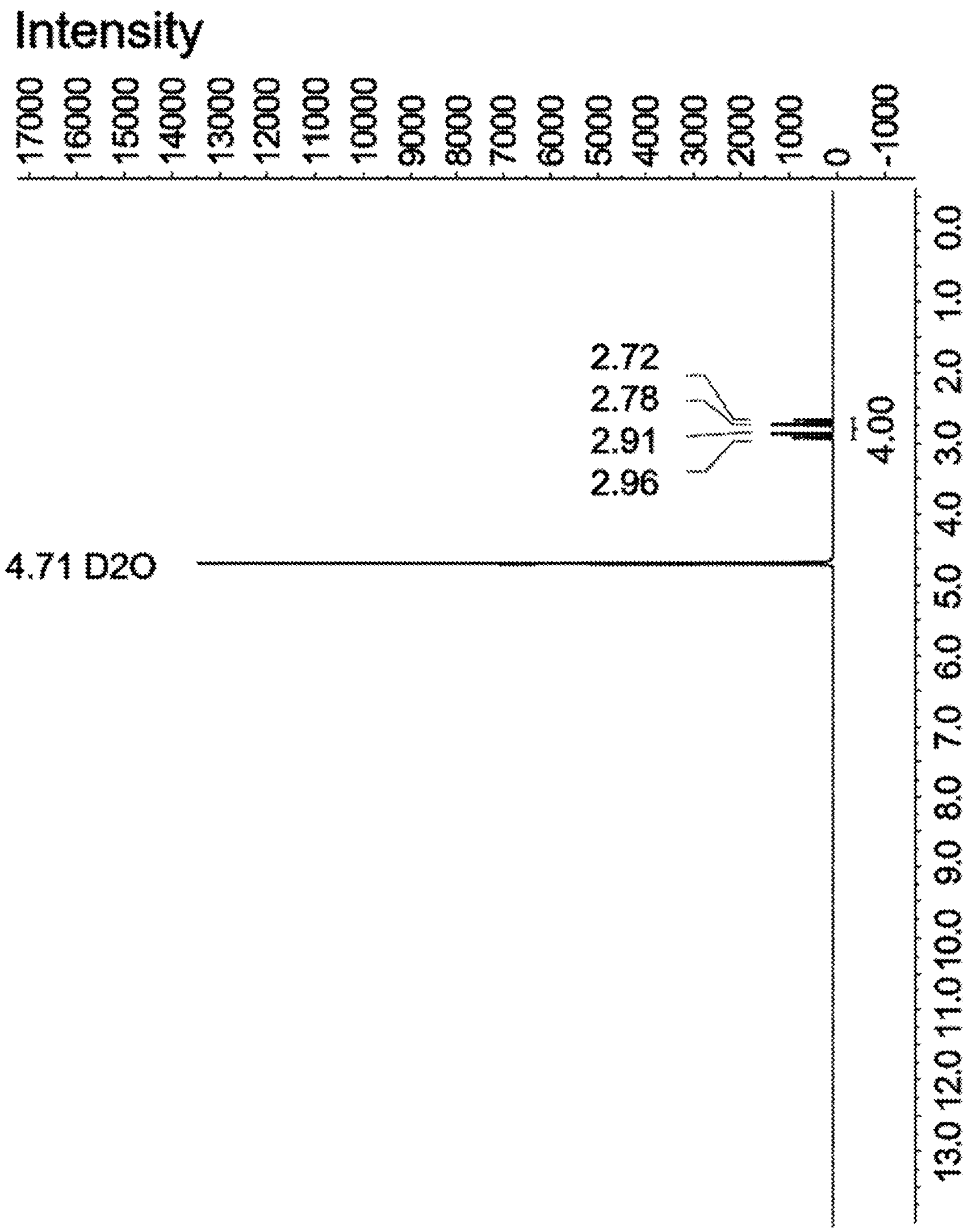
Figure 5:
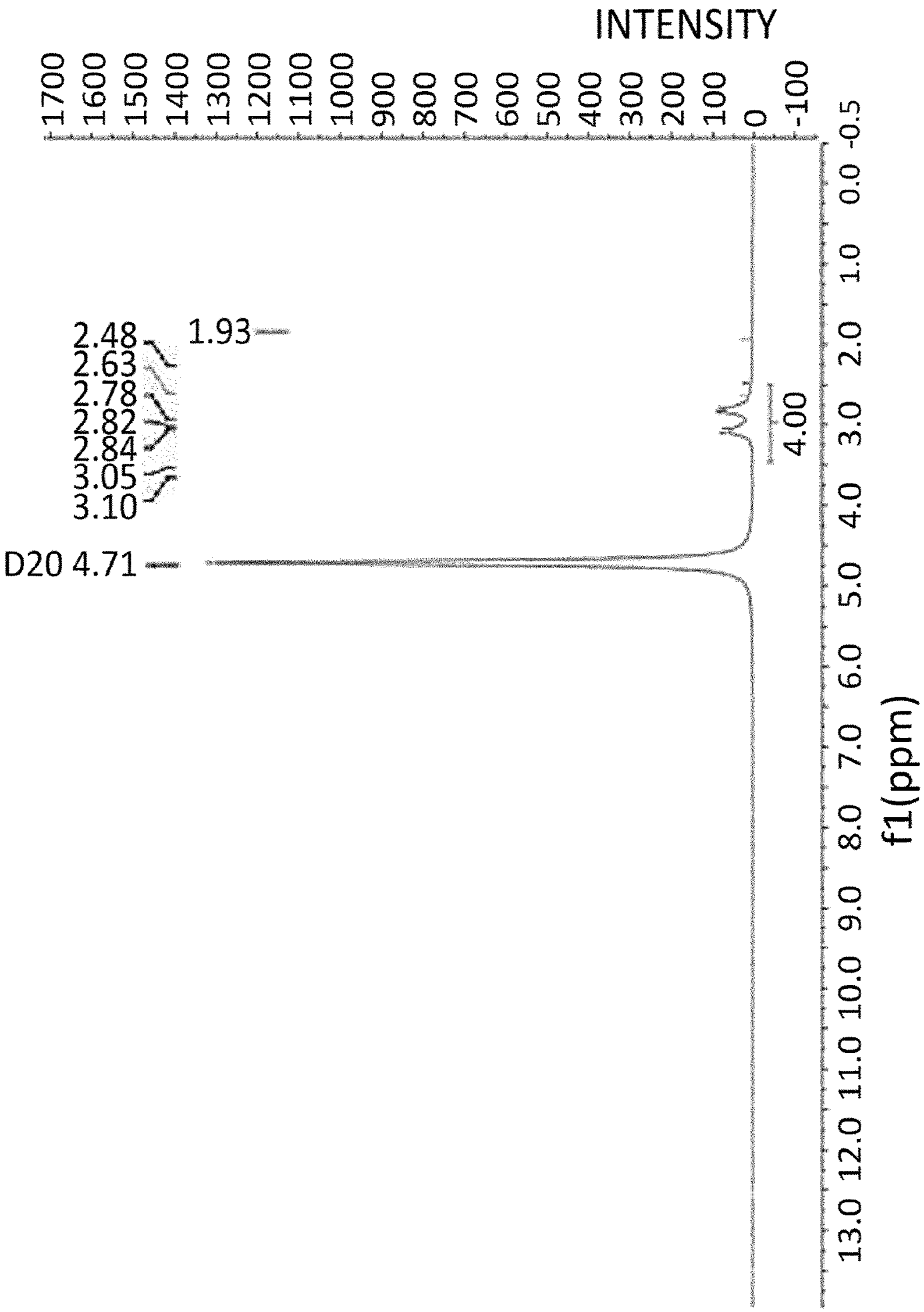

The complex compound of Example 1 and citric acid were dissolved in solvents MeOD3 and D2O, and then data was measured using a liquid (solid)-state nuclear magnetic resonance spectrometer (liquid (solid)-state 200 MHz NMR spectrometer; Avance Neo 600 (Prodigy)). FIG. 2 is data obtained by dissolving citric acid in MeOD3, and FIG. 3 is data obtained by dissolving the complex compound in MeOD3. FIG. 4 is data obtained by dissolving citric acid in D2O, and FIG. 5 is data obtained by dissolving the complex compound in D2O.

2. Measurement of Particle Size of Complex Compound

Figure 6:
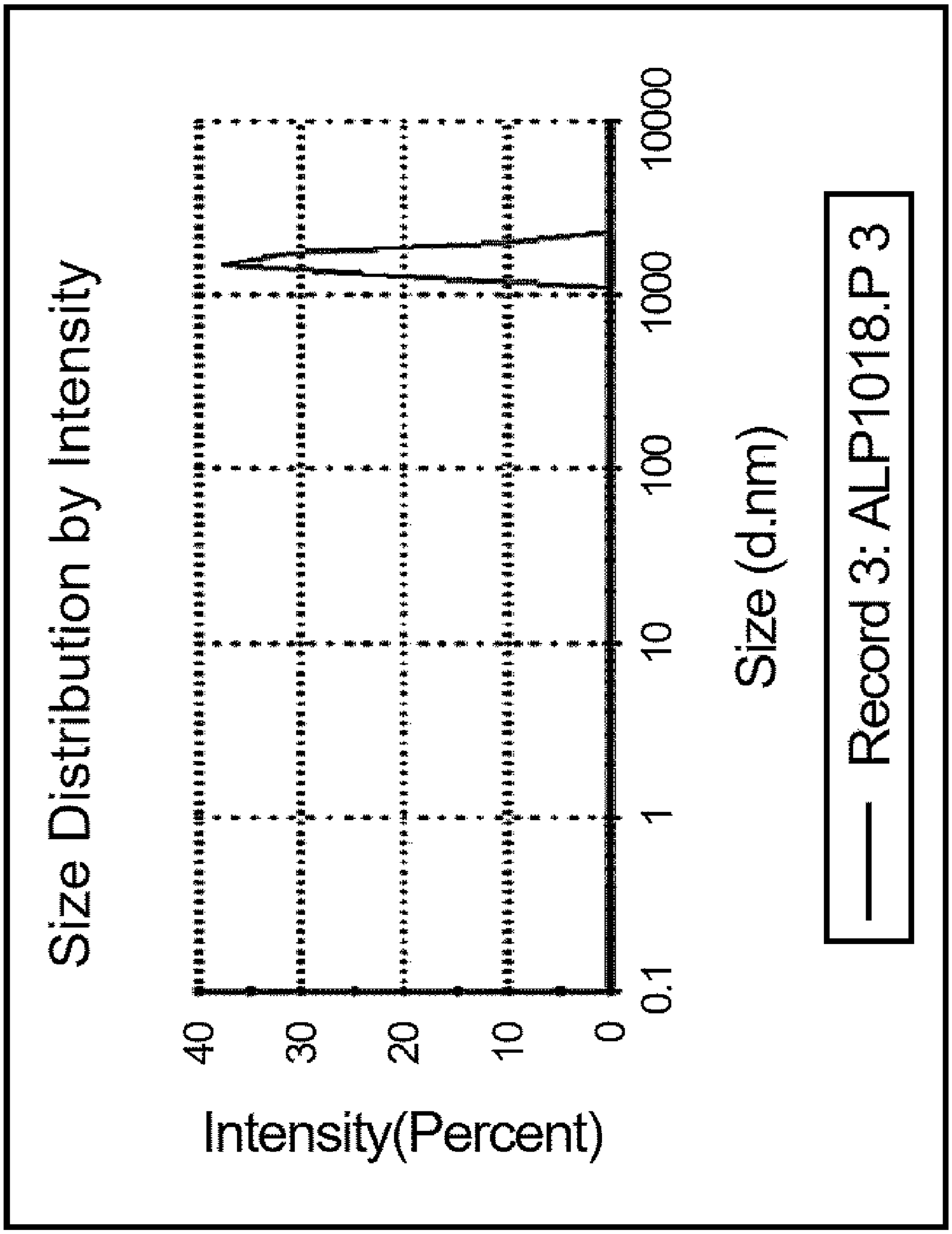
FIG. 6 shows a result obtained by measuring the particle size of a complex compound.

The particle size of the complex compound of Example 1 was measured using a particle size analyzer (dynamic light scattering (DLS), Malvern Zetasizer Nano ZS), and results thereof are shown in FIG. 6. In this case, it can be confirmed that particle intensity was 100%.

In the case of the complex compound of Comparative Example 1, there was a peak corresponding to a particle whose size was less than 100 nm, and intensity was less than 5%.

3. XPS Analysis

Figure 7:
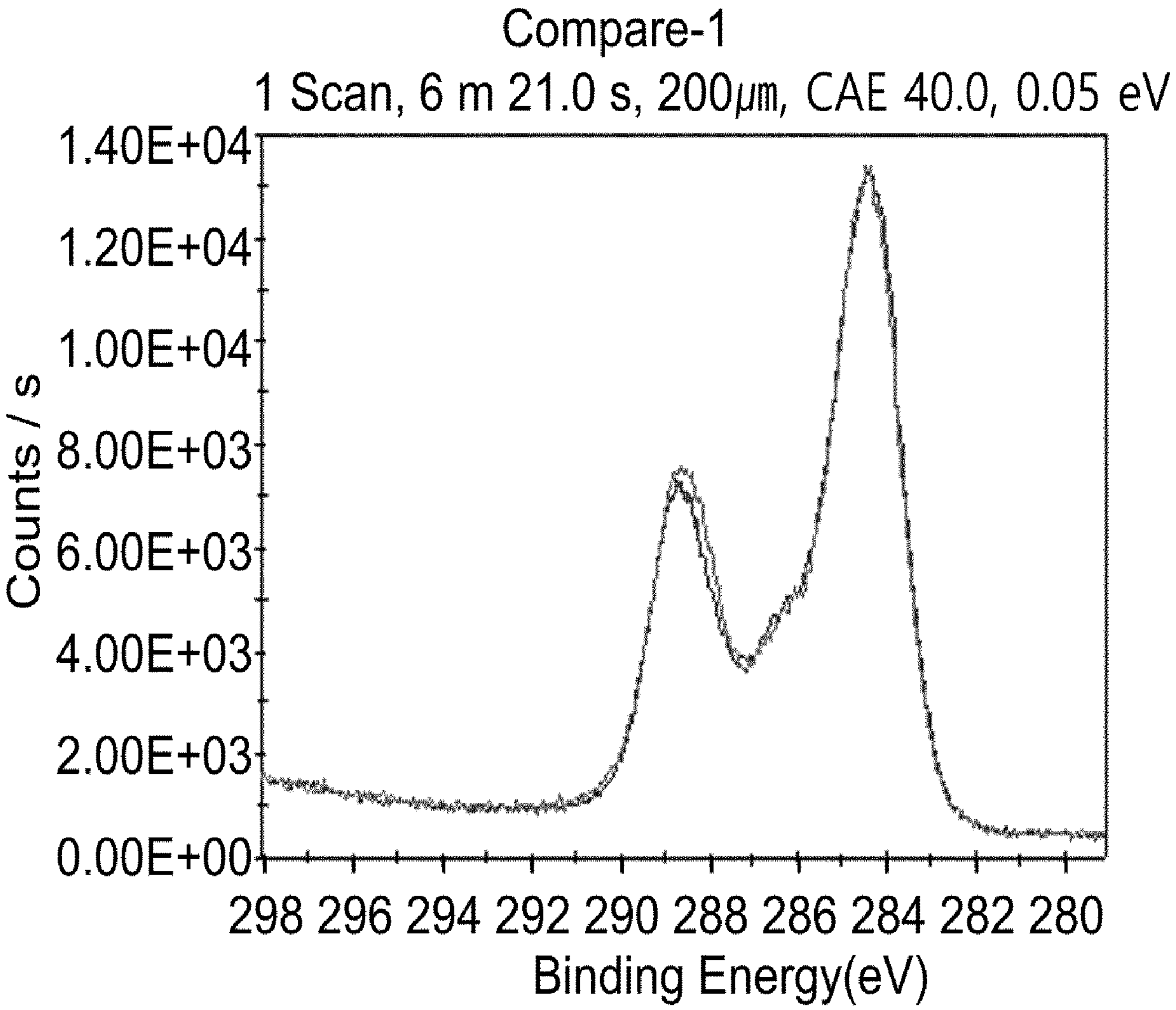
FIGS. 7, 8 and 9 show XPS results.
Figure 8:
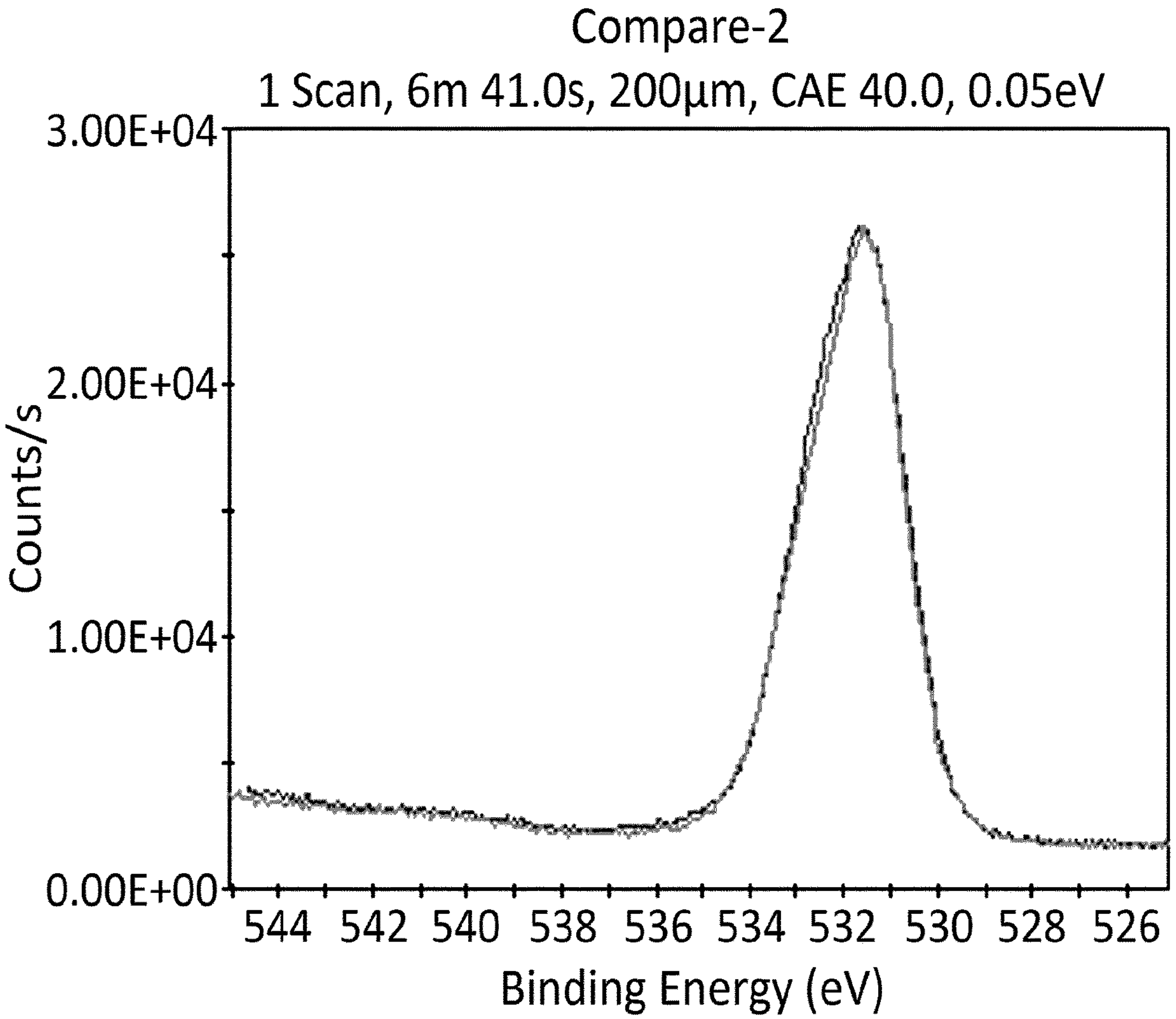
Figure 9:
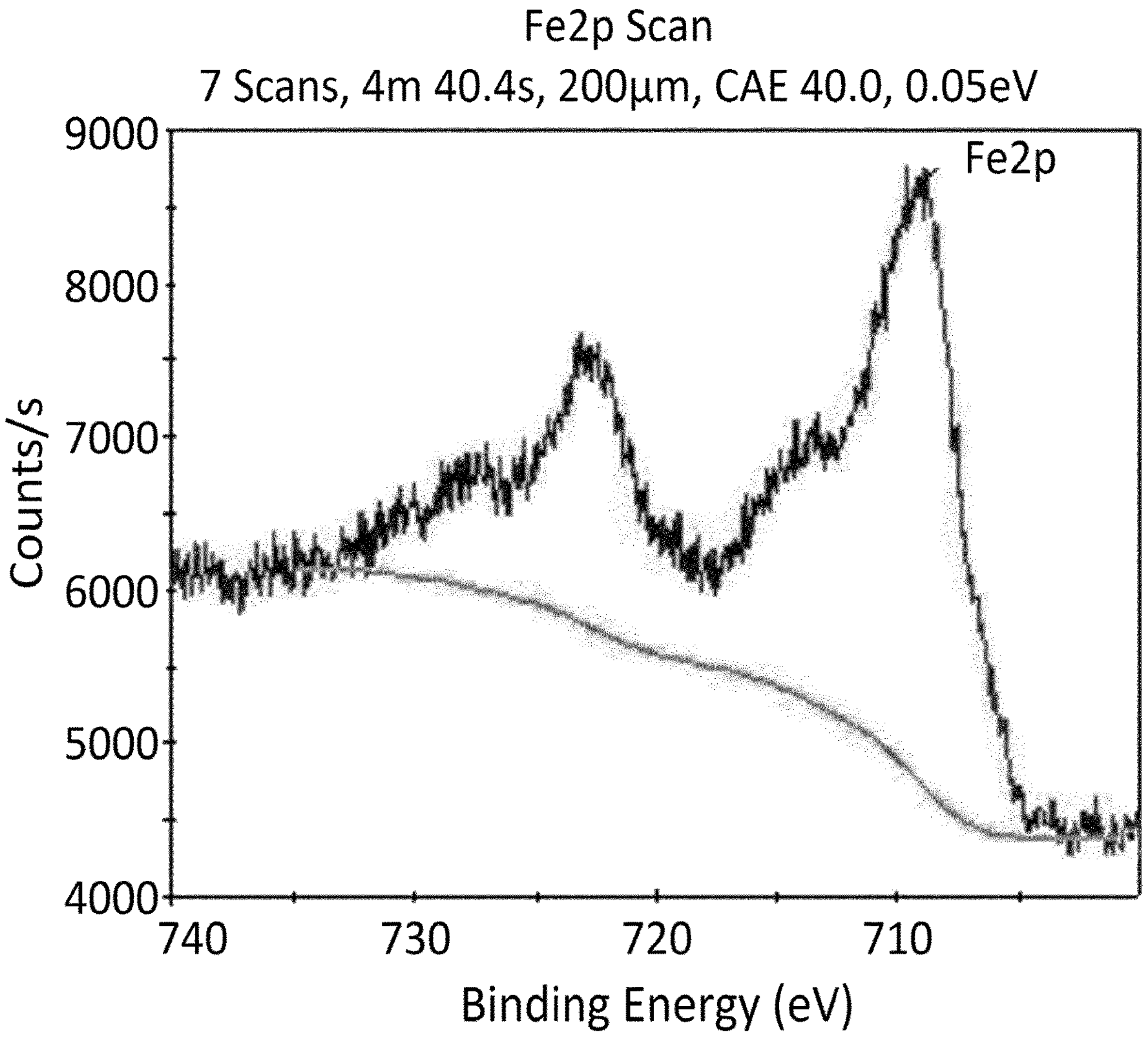

The complex compound of Example 1 was analyzed using an X-ray photoelectron spectrometer system (ThermoFisher Scientific), and results thereof are shown in FIGS. 7 to 9.

FIG. 7 shows that double bonds between carbon and oxygen were increased, FIG. 8 shows that carbon-OH bonds were reduced, and new bonds were increased. FIG. 9 shows that iron was bonded to oxygen.

4. MALDI-TOF Analysis

Figure 11:
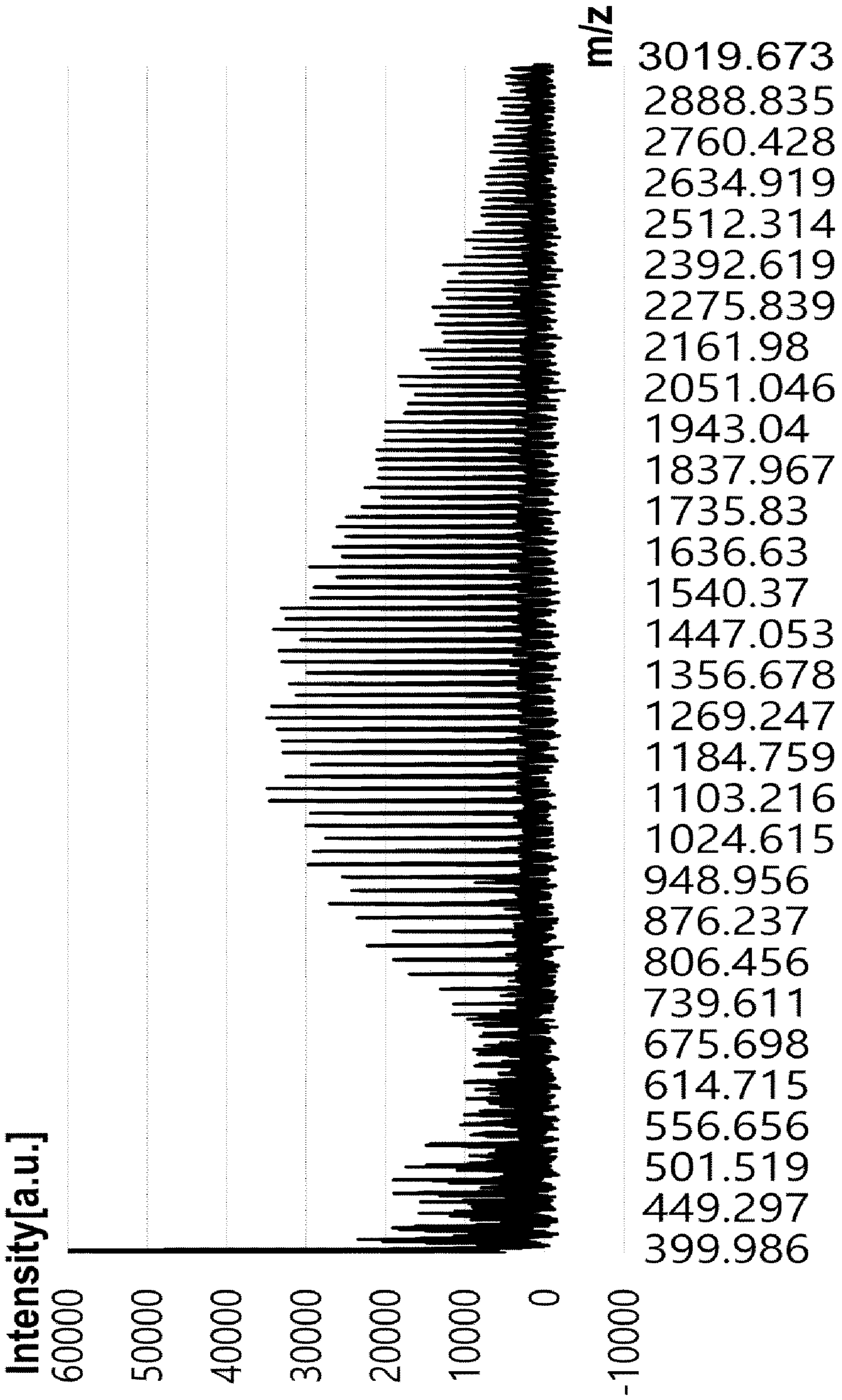

Citric acid and the complex compound of Example 1 were measured using a matrix-assisted laser desorption ionization mass spectrometer (MALDI-TOF, Bruker Autoflex III). The MALDI-TOF data of citric acid is shown in FIG. 10, and the MALDI-TOF data of the complex compound of Example 1 is shown in FIG. 11. The horizontal axis in FIGS. 10 and 11 represents molecular weight in Da(m/z), and the vertical axis represents intensity.

In FIG. 11 looking at the peaks distributed over the molecular weight of 440 to 3,080, it can be confirmed that a complex compound in which a:b was 1:2 and n was 1 to 7 was produced as a result of polymerization.

5. Electron Microscope Measurement

Figure 12:
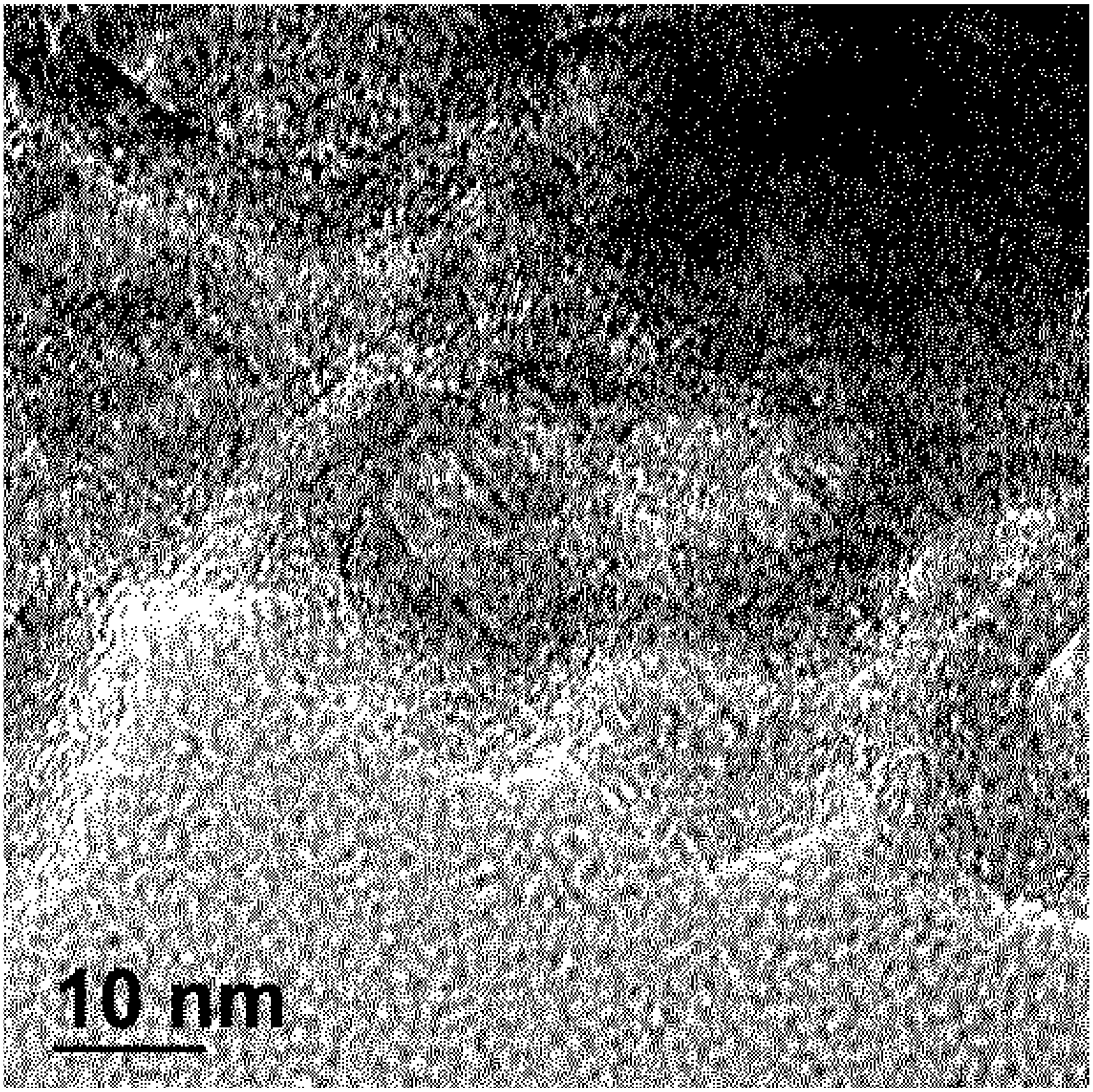
FIG. 12 shows a result obtained by measuring a complex compound using an electron microscope.

The complex compound of Example 1 was measured using a FE-TEM (JEM-3011 HR, JEOL) instrument, and results thereof are shown in FIG. 12. The presence of a crystal structure was confirmed by observing comb patterns at regular intervals inside, and it was also confirmed that the form of citric acid (citrate) surrounded the complex compound by covering the periphery of the crystal structure with an amorphous structure.

While specific parts of the present application have been described in detail, it will be obvious to those skilled in the art that the specific descriptions are merely exemplary embodiments, and the scope of the present application is not limited thereto. Therefore, the substantial scope of the present application will be defined by the appended claims and their equivalents.

What is claimed is:

1. A complex compound in which a citrate and an iron ion are combined to form the following chemical formula:

[Chemical Formula 1]

$$[Fe_a(H_3\bullet C_6H_5O_7)_b(H_2O)]_n$$

wherein, in Chemical Formula 1, a ratio of a and b is 1:2 to 1:3, and n is an integer of 1 to 6, wherein the complex compound has a diameter of 1,300 nm to 3,000 nm, wherein an iron content in the complex compound is 8.5 wt % to 12.7 wt %, wherein the complex compound has a molecular weight of 458 g/mol to 2,747 g/mol, and wherein the complex compound has the property of dissolving in 5° C. to 40° C. water, and wherein the complex compound is prepared by a process comprising:

mixing citric acid or a salt thereof and pure iron or electrolytic iron in a solvent;

dehydrogenating the mixed solution at 20° C. to 80° C. and 7 atm to 20 atm; and stirring the solution after the removal of hydrogen gas.

2. The complex compound of claim 1, wherein the complex compound has the property of dissolving in 5° C. to 40° C. water within 5 minutes.

3. The complex compound of claim 1, wherein the complex compound has the property of dissolving in 20±5° C. water within 5 minutes.

4. The complex compound of claim 1, wherein the iron ion is a ferrous ion ($Fe^{2+}$).

5. The complex compound of claim 1, wherein the complex compound maintains a crystal structure at pH 2 to pH 4.

6. A food composition comprising the complex compound according to claim 1, wherein the complex compound has a diameter of 1,300 nm to 3,000 nm, wherein an iron content in the complex compound is 8.5 wt % to 12.7 wt %, wherein the complex compound has a molecular weight of 458 g/mol to 2,747 g/mol, wherein the complex compound has the property of dissolving in 5° C. to 40° C. water, and wherein the complex compound is prepared by a process comprising:

mixing citric acid or a salt thereof and pure iron or electrolytic iron in a solvent;

dehydrogenating the mixed solution at 20° C. to 80° C. and 7 atm to 20 atm; and stirring the solution after the removal of hydrogen gas.

7. The food composition of claim 6, wherein the complex compound has the property of dissolving in 5° C. to 40° C. water within 5 minutes.

8. The food composition of claim 6, wherein the complex compound has the property of dissolving in 20±5° C. water within 5 minutes.

9. The food composition of claim 6, wherein the iron ion is a ferrous ion ($Fe^{2+}$).

10. The food composition of claim 6, wherein the complex compound maintains a crystal structure at pH 2 to pH 4.

* * * * *